Figure 1:
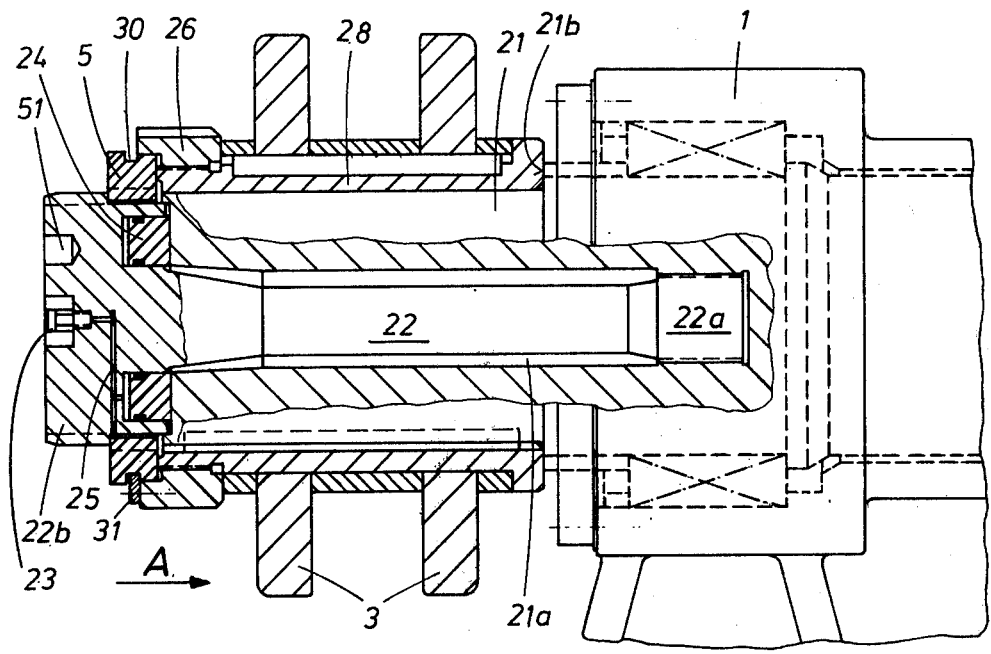

United States Patent
Pillon et al.

[11] 3,985,013
[45] Oct. 12, 1976

[54] APPARATUS FOR RAPIDLY CHANGING STRAIGHTENING ROLLERS OF A ROLLER STRAIGHTENING MACHINE

[75] Inventors: Horst Pillon, Bous, Saar; Günther Morath, St. Ingbert, Saar, both of Germany

[73] Assignee: Moeller & Neumann GmbH, St. Ingbert, Saar, Germany

[22] Filed: Aug. 11, 1975

[21] Appl. No.: 603,305

[30] Foreign Application Priority Data
Aug. 16, 1974 Germany............................ 2439329

[52] U.S. Cl..................................... 72/238; 72/160
[51] Int. Cl.².......................................... B21B 31/08
[58] Field of Search...................... 72/238, 239, 160

[56] References Cited
UNITED STATES PATENTS
3,559,441  2/1971  Lemper et al. ...................... 72/239
3,842,640  10/1974  Schmitt et al. .................... 72/238 X

*Primary Examiner*—Milton S. Mehr
*Attorney, Agent, or Firm*—John J. Dennemeyer

[57] ABSTRACT

Apparatus for rapidly changing the straightening rollers of a roller straightening machine for rolled bars or profiles comprises a linearly and pivotally displaceable support device provided with rotatable transfer shafts which can be moved in line with the roller axes of the machine; withdrawal bayonet rings which are axially displaceable on the transfer shafts and which are lockingly engageable with bayonet rings secured to the straightening rollers are arranged to pull the rollers onto the transfer shafts, and vice versa.

5 Claims, 4 Drawing Figures

APPARATUS FOR RAPIDLY CHANGING STRAIGHTENING ROLLERS OF A ROLLER STRAIGHTENING MACHINE

The invention relates to apparatus for rapidly changing straightening rollers, or a mounting sleeve supporting a straightening roller of a roller straightening machine, having a support device provided with at least one transfer shaft or stub, the shaft or stub being adjustable into line with a roller axis and arranged to be centred with the latter in order that a straightening roller can be pushed thereon after means for locking the roller to the roller axis have been released and a withdrawal bayonet ring rotatably supported by the transfer shaft or stub has been locked to the straightening roller or the mounting sleeve (German Patent Specification No. 687,920 and German Gebrauchsmuster No. 6,602,253).

In known rapid-change devices for straightening rollers, a nut or other securing means, such as, for example, a bayonet ring or a split clamping ring, must be actuated by means of manual operation before a withdrawal device is attached which is disposed at the transfer shaft or shafts, for releasing a locking means of the straightening roller or the mounting sleeve on the straightening roller axis. To the extent to which force must be applied, for rotating for example a bayonet ring having claws provided with a slight inclination in order to effect locking, a corresponding amount of force is also necessary for releasing the locking means. The invention is based on the object to provide a means for rapidly locking or securing a straightening roller, or a mounting sleeve therefor, on the roller axis, which rapid locking or securing means does not require an appreciable amount of force when the locking or securing means is being locked as well as when it is being released, and which ensures at the same time that the released bayonet ring need not be manually removed when the straightening roller, or the mounting sleeve, is withdrawn from the roller axis.

This object is attained by apparatus for rapidly changing the straightening rollers or a mounting sleeve supporting a straightening roller of a roller straightening machine comprising a supporting device provided with at least one transfer shaft or stub which is adjustable into alignment with the roller axis and which can be centred therewith, onto which transfer shaft or stub a straightening roller can be pushed after a means locking the roller to its axis has been released and a withdrawal bayonet ring rotatably mounted on the transfer shaft or stub has been locked to the straightening roller or the mounting sleeve, wherein a tie-rod which can be temporarily hydraulically extended is inserted into the hollow-bored roller axis, the inner end of the tie-rod being fixed to the roller axis and the other end being provided with a tensioning head which is smaller in diameter than the diameter of the inner bore of the straightening roller or the mounting sleeve, wherein the outer periphery of the tensioning head is provided with longitudinal grooves and ledges for receiving a first bayonet ring which is rotatable in the locked position only when the tie-rod is lengthened and which, when the tie-rod is shortened and still under tension, presses against an end face of the straightening roller or the mounting sleeve, and wherein the first bayonet ring is rotatably centred relatively to the straightening roller on a portion of the axial length of its outer periphery and is axially fixed while permitting a displacement corresponding to the change of length of the tie-rod, and which is constructed on the remaining portion of the axial length for receiving a withdrawal bayonet ring which is axially displaceable on the transfer shaft or stub and which in the locked position is displaceable together with the axially-fixed first bayonet ring and the straightening roller or the mounting sleeve onto the transfer shaft or stub to such extent that the straightening roller or the mounting sleeve together with the first bayonet ring is received by the transfer shaft or stub.

Since a first bayonet ring supported by the tensioning head of a hydraulically extendable tie-rod can be loosened by extending or lengthening this tie-rod, the ring can be easily rotated by hand into its unlocked position for the purpose of preparing the interchange of straightening rollers. Its claws and also the lands remaining in the form of ledges between the longitudinal grooves of the tensioning head need no longer be provided with a screwthread-like inclination of the cooperating pressure faces, since the tensioning force for fixing a straightening roller or a mounting sleeve in the locking position of the first bayonet ring is effected by the shortening of the tie-rod relieved of the hydraulic extension pressure. Since the first bayonet ring is of bayonet-like construction also on its outer periphery for receiving a known withdrawal bayonet ring associated with the transfer shaft or stub and additionally is rotatable, but axially fixed, relatively to the straightening roller or the mounting sleeve, the straightening roller or the mounting sleeve can be pushed by the withdrawal bayonet ring onto the transfer shaft or stub since its locking means is locked to that of the first bayonet ring, whereby the first bayonet ring is also displaced and is also moved onto the shaft or stub. It is, so to speak, part of the element to be interchanged, and such a ring is provided also on the straightening rollers or mounting sleeves held ready for insertion. Thus, during a straightening roller change, there do not exist any loose component parts which may have a considerable weight in the case of heavy straightening machines and which necessitate the use of a crane or hoist for dismantling.

Further features are disclosed below which relate to the construction of the transfer shaft or stub and a pushing device for the withdrawal bayonet ring to suit the means for rapidly locking the straightening rollers or mounting sleeves to the roller axes of a roller straightening machine, the functioning of the locking means being developed in view of an automated withdrawal process. Detailed explanations relating thereto may be seen from the descriptions of the accompanying drawings.

Figure 2:
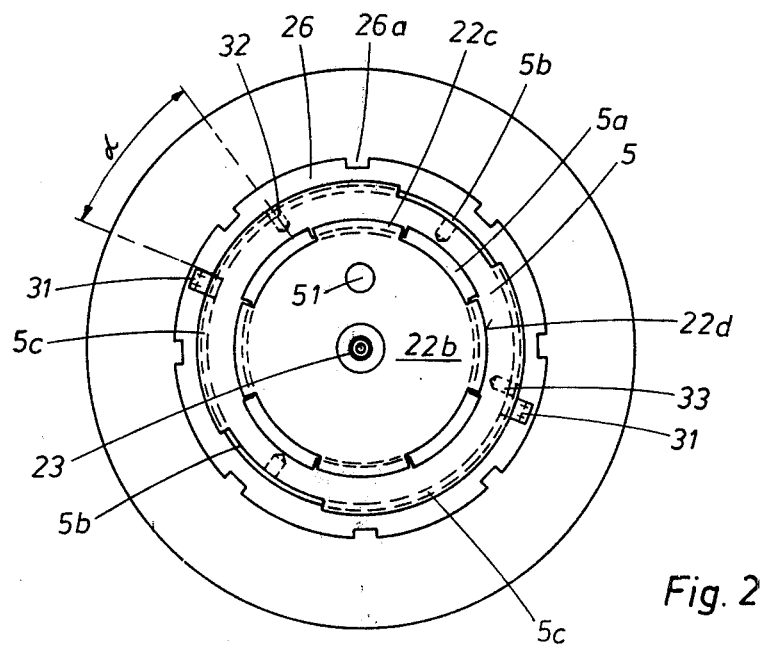
Figure 3:
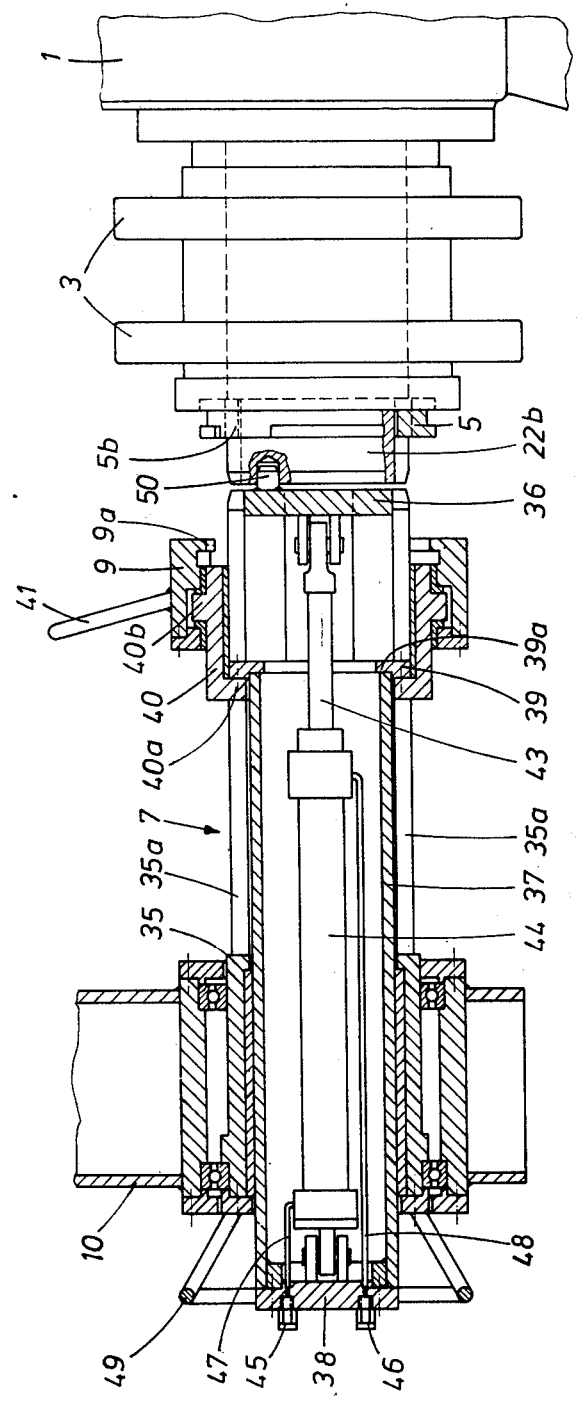
Figure 4:
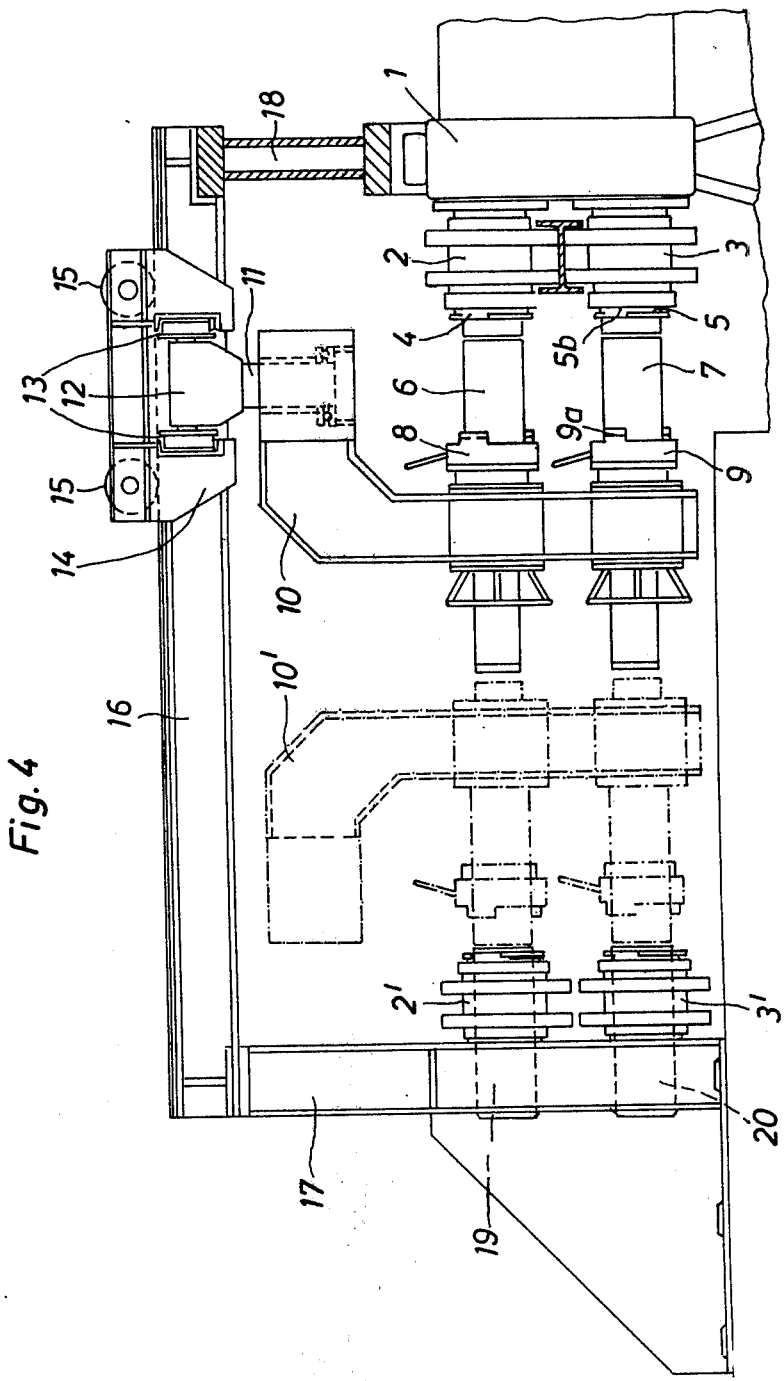

One constructional example of apparatus for rapidly changing the straightening rollers of a roller straightening machine in accordance with the invention is described below with reference to the accompanying drawings, in which:

FIG. 1 illustrates a partial longitudinal section through a roller axis having a straightening roller secured on a mounting sleeve, FIG. 2 is a view of FIG. 1 in the direction of arrow A, FIG. 3 is a longitudinal section through a transfer shaft supported by a support device in a receiving position centred relatively to a roll axis, and FIG. 4 is an illustration of the whole changing apparatus.

In the illustration of the whole changing apparatus illustrated in FIG. 4 a portion 1 of a roller straightening machine has two straightening rollers 2,3 which obviously lie in different vertical planes. For the purpose of withdrawing them the straightening rollers are united with first rotatable bayonet rings 4,5, respectively, which can be locked to withdrawal bayonet rings 8,9 on respective transfer shafts 6,7. In the constructional example the transfer shafts 6,7 are mounted in a hanging angled or cranked support device 10 which is mounted for pivotal movement about a vertical pivot axis 11 of a carriage 12 provided with running rollers 13. Running rails for the carriage 12 are supported by at least two further carriages 14 which are displaceable by means of running rollers 15 transversely to the direction of displacement of the carriage 12 on overhead rails 16. The rails 16 are supported by vertical supports 17,18. After the set of straightening rollers 2,3 has been pushed onto the transfer shafts 6,7 moved into line with the roller axes, the support device 10 is rotated through 180° and the carriage 14 is displaced towards the left to such extent that the support device attains the position 10' illustrated by dash-dotted lines. The straightening rollers can then be pushed onto stationary transfer shafts 19,20 located in the support 17, where they assume the positions 2' and 3' respectively.

Thereupon the support device can be moved, by displacement of the carriage 12, in front of further stationary transfer shafts 19,20 (not shown) onto which previously replacement straightening rollers had been pushed which are to be inserted into the straightening machine.

The part of the invention relating to the locking device for the straightening rollers will now be explained with reference to FIGS. 1 and 2. FIG. 1 shows on an enlarged scale the portion 1 of the roller straightening machine with the bearing for a roller axis 21. The roller axis 21 has a central blind bore 21a into the screw-threaded inner end of which is screwed the screw-threaded end 22a of a hydraulically-extendable tie-rod 22. The other end of the tie-rod is constructed in the form of a tensioning head 22b provided with an annular cylinder recess guiding a ring piston 24. This ring piston 24 can be loaded with pressure oil by way of a connector nipple 23 (FIG. 2) and a pressure duct 25 so that the tie-rod 22 can be extended, i.e., lengthened, because the screw-threaded end 22a of the latter is fixed and the ring piston 24 is supported on an end face of the roller axis 21. The tensioning head 22b of the tie-rod 22 has longitudinal grooves which are distributed over its periphery and between which four lands in the form of ledges 22c (FIG. 2) remain. It is constructed thereby for receiving the first bayonet ring 5, the inner periphery of which is provided with longitudinal grooves 5a between which radially inwardly directed lands or ledges remain which in the locking position illustrated in FIG. 2 are placed behind the ledges 22c of the tensioning head 22b. When the bayonet ring 5 is rotated through an angle α, its ledges are displaced into, or out of, the position behind the ledges 22c of the tensioning head and the locked or unlocked position, respectively, is produced thereby.

On the portion of the axial length of its outer periphery disposed adjacent the straightening roller 3 the bayonet ring 5 is rotatably guided in a tensioning nut 26 which is provided on the outside with longitudinal grooves 26a for engagement by a hooked spanner. This tensioning nut serves for fixing the straightening roller 3 on a mounting sleeve 28. The mounting sleeve 28, in turn, is secured by means of the extendable tie-rod 22 and the bayonet ring 5 which, when the tie-rod 22 is shortened upon release of the hydraulic extension pressure, presses against an outer end face of the mounting sleeve 28 and tightens the latter against a collar 21b of the roller axis 21.

The bayonet ring 5 has on its outer periphery a ring groove 30 into which engage two lugs 31 attached to the tensioning nut 26 which also serves as a coupling means by which the bayonet ring 5 is axially fixed relatively to the straightening roller 3 and the mounting sleeve 28, however with axial play which is recognisable in FIG. 1 as the difference between the thickness of the lug 31 and the clear width of the groove 30 and which takes account of the fact that a displacement of the bayonet ring 5, in consequence of a length change of the tie-rod 21, relative to the mounting sleeve 28 and the tensioning nut 26 must be permitted. FIG. 1 illustrates the tie-rod 22 in the state of its longitudinal extension effected by loading the ring piston 24, which state permits rotation of the bayonet ring 5 out of the locking position illustrated in FIG. 2 into the withdrawal position. When the hydraulic pressure is released and the tie-rod is shortened thereby, the bayonet ring 5 can follow the displacement occurring to the right — referred to the tension head 22b — because of the play provided.

One of the advantageous effects of the locking of the mounting sleeve 28 by means of tension remaining in the tie-rod consists in that the ledges 22c of the tensioning head 22b and the ledges of the bayonet ring 5 which are disposed opposite each other in the locking position of the bayonet ring 5 need not have a screwthread-like inclination such as is necessary in other bayonet connections or closures.

On the other hand it follows herefrom that the extent of the rotational displacement of the bayonet ring 5 must be defined in the two possible end positions, namely the locked position and the unlocked position. For this purpose the two lugs 31 are disposed diametrically opposite and serve as abutments for a locating pin which is alternately inserted into one of two blind bores 32 and 33 which extend in the same vertical plane of the ring groove 30. The blind bore 33 lies immediately adjacent a lug 31, i.e., in the illustrated rotated position of the bayonet ring 5, a locating pin inserted into the blind bore 33 abuts the lug 31. For unlocking, the locating pin is inserted into the blind bore 32, the angular off-set between the two blind bores 32,33 being such that after rotation through an angle α the locating pin abuts against the other lug 31 in which position the co-operation between the ledges of the bayonet ring and the ledges 22c of the tensioning head 22b ceases. These two defined rotated positions of the bayonet ring 5 are also essential for the production of an engagement between the withdrawal bayonet ring 9 previously referred to (FIG. 4) and the first bayonet ring 5. For this purpose the bayonet ring 5 is constructed on the portion of the axial length of its outer periphery which is disposed in FIG. 1 on the left of the ring groove 30 for receiving the withdrawal bayonet ring 9, i.e., is provided with longitudinal grooves 5b between which axial ledges 5c remain. One of the grooves 5b moreover may be seen also in FIG. 4 as well as a claw 9a of the withdrawal bayonet ring 9 which can enter into a groove 5b in order to lock the bayonet ring 9, after rotation thereof, to the first bayonet ring 5.

The transfer shaft 7 which is adjustable centrally to the roller axis 21 by means of the displaceable support device 10 is illustrated in detail in FIG. 3, the details obviously applying also to the transfer shaft 6. Accordingly, each transfer shaft consists of two mutually telescoped sleeves, namely an outer sleeve 35 and an inner sleeve 37. The outer sleeve 35 carries at one end a head plate 36 and the inner sleeve 37 is provided at the opposite or rear end with a bottom plate 38. The outer sleeve 35 has peripherally-disposed longitudinal grooves 35a which terminate in the region of the head plate 36 and which correspond to the longitudinal grooves of the tensioning head 22b of the tie-rod 22 in order that the bayonet ring 5 can also be pushed thereover when the straightening roller 3 is pushed onto the transfer shaft 7. Moreover the outer periphery 22d of the lands or ledges 22c of the tensioning head correspond to the outer periphery of the ledges remaining between the longitudinal grooves 35a of the outer sleeve 35, and altogether the inner bore of the mounting sleeve 28 is slightly greater than the said outer peripheries of the parts 22b and 35.

The inner sleeve 37 carries at its open end facing the tensioning head 22b a ring 39 with peripherally-distributed radial projections 39a which are guided in the longitudinal grooves 35a of the outer sleeve 35. In turn inwardly-directed projections 40a of a support sleeve 40 are connected to these projections 39a; the withdrawal bayonet ring 9 is rotatable on the supporting sleeve 40 but is arranged to be axially non-displaceable thereon by means of a ring collar 40b. A hand-grip 41 serves for rotating the bayonet ring 9 in order to control the claws 9a of the withdrawal bayonet ring 9 into the longitudinal grooves 5b of the first bayonet ring 5 and then for permitting to establish the locked position by rotation of the bayonet ring 9, the locked position being necessary for withdrawing the straightening roller 3. The inwardly-directed projections 40a of the support sleeve 40 are also guided in the longitudinal grooves 35a of the outer sleeve 35.

Between the head plate 36 of the outer sleeve 35 and the bottom plate 38 of the inner sleeve 37 there is disposed a power cylinder 45 with a piston rod 43 which can be loaded in a double-acting manner by a pressure medium supplied through connecting nipples 45 and 46 as well as through pipes 47 and 48. When the piston rod 43 is moved out, it is supported by means of the head plate 36 on the outer end face of the tensioning head 22b so that the cylinder 44 pushes the bottom plate 38 and therewith the inner sleeve 37 towards the left. During this movement the straightening roller 3 together with its mounting sleeve 28 is withdrawn from the roller axis 21 and transferred to the transfer shaft 27 after the withdrawal bayonet ring 9 had previously been moved into engagement with the bayonet ring 5 and into the locking position by means of an adjusting movement in the opposite direction of the piston rod 34. A condition for this withdrawal process is further that — with reference to FIGS. 1 and 2 — the tie-rod 22 had been axially extended by loading the ring piston 24 and thereafter the first bayonet ring 5 had been unlocked which is effected in the manner described by insertion of a radial locating pin into the blind bore 32 and a rotation to the left through the angle α until the locating pin abuts against one of the lugs 31. Upon transfer of the straightening roller 3 in this rotated position of the bayonet ring 5, the inner longitudinal grooves 35a of the bayonet ring arrive over the parts of the outer sleeve 35 remaining between the longitudinal grooves 35a.

As may be seen further from FIG. 3 the transfer shaft 7 is rotatably mounted in the support device 10 and is provided with a hand-wheel 49 for performing rotary movements. This rotatability serves for permitting a centring pin 50 to engage into a blind bore 51 of the tensioning head 22b (FIG. 1), the centring pin 50 being eccentrically disposed on the head plate 36 of the outer sleeve 35 and being axially-displaceable against the force of a spring. Thereby the corresponding aligned position referred to of all longitudinal grooves in the tensioning head 22b as well as of the outer sleeve 35 of the transfer shaft 7 is adjusted. The aligned position of the roller axis 21 with the transfer shaft 7 is produced by positional adjustment of the displaceable support device 10.

The manner of working of the straightening roller changing apparatus described is as follows:

First, the ring piston 24 is subjected to pressure by connecting an injector pump to the connecting nipple 23 of the tensioning head 22b of the tie-rod 22, whereby the tie-rod is lengthened and the tensioning head 22b is displaced to the left. Thereby the first bayonet ring 5 is relieved and can then be rotated through the angle α in the manner previously described. After the injector pump has been removed and thereby the end face of the tensioning head 22b of both straightening rollers 2 and 3 has been laid free, the aligned position of the two transfer shafts 6 and 7 with the corresponding roller axes 21 is produced by displacement of the support device 10. By rotation of the hand-wheels 49 the centring pins 50 are forced to drop into the blind bores 51 of the tensioning heads 22b, and thereafter the power cylinder 44 is actuated in the sense that the piston rod 43 is drawn inwardly. Thereby the inner sleeve 37 moves towards the right (FIG. 3) together with the support sleeve 40 which is guided on the radial ledges between the longitudinal grooves 35a of the outer sleeve 35, and together with the withdrawal bayonet ring 9, this bayonet ring with its claws 9a being so disposed that the claws enter into the longitudinal grooves 5b on the outer periphery of the bayonet ring 5. After locking the two bayonet rings 9 and 5 one to the other, the power cylinder 44 is reversely controlled, whereby the piston rod 43 is supported by means of the head plate 36 on the outer end face of the tensioning head 22b and the inner sleeve 37 is displaced together with the locked bayonet rings 9 and 5 and the straightening roller 3 since the bayonet ring 5 is axially locked to the tensioning nut 26 by means of the lugs 31.

After the two straightening rollers 2,3 have been transferred to the transfer shafts 6 and 7 the support device 10 is displaced in the manner described above into the position 10' and is pivoted in order to transfer the two straightening rollers to the stationary shafts 19 and 20.

What is claimed is:

1. Apparatus for rapidly changing straightening rollers of a straightening machine for straightening rolled bars or profiles, comprising straightening rollers, each straightening roller mounted on a mounting sleeve means in turn mounted on a roller axis, said roller axis being hollow, a hydraulically extendable tie-rod means having one end screw-threaded and screwed into said hollow axis, and another end provided with a tensioning head means projecting from said hollow axis, a first bayonet ring means mounted on said tensioning head means, said tie-rod means, in a non-extended state thereof, pressing said first bayonet ring means into roller securing engagement with said mounting sleeve means, and in an extended state permitting rotation of said first bayonet ring means into a first position in which said first bayonet means is axially slidable together with said mounting sleeve means and said roller mounted thereon, a coupling means secured on said mounting sleeve means and engaging into said first bayonet ring means, said coupling means permitting rotary and limited axial displacement of said first bayonet ring means relative to said mounting sleeve means, and into a second position in which said first bayonet ring means is locked to said tensioning head means, a support device mounted for linear and pivotal displacement into line with said hollow axis, a transfer shaft means rotatably mounted in said support device, a withdrawal bayonet ring means displaceable on said transfer shaft means and lockably engageable with said first bayonet ring means to withdraw said first bayonet ring means and said mounting sleeve means coupled thereto by said coupling means and supporting said straightening roller from said hollow axis over said tensioning head means and onto said transfer shaft means, said tensioning head means having an outer periphery provided with longitudinal grooves and with ledges for receiving said first bayonet ring means.

2. Apparatus for rapidly changing the straightening rollers or a mounting sleeve supporting a straightening roller of a roller straightening machine, comprising a supporting device provided with at least one transfer shaft or stub which is adjustable into alignment with the roller axis and which can be centred therewith, onto which transfer shaft or stub a straightening roller can be pushed after a means locking the roller to its axis has been released and a withdrawal bayonet ring rotatably mounted on the transfer shaft or stub has been locked to the straightening roller or the mounting sleeve, wherein a tie-rod which can be temporarily hydraulically extended is inserted into the hollow-bored roller axis, the inner end of the tie-rod being fixed to the roller axis and the other end being provided with a tensioning head which is smaller in diameter than the diameter of the inner bore of the straightening roller or the mounting sleeve, wherein the outer periphery of the tensioning head is provided with longitudinal grooves and ledges for receiving a first bayonet ring which is rotatable in the locked position only when the tie-rod is lengthened and which, when the tie-rod is shortened and still under tension, presses against an end face of the straightening roller or the mounting sleeve, and wherein the first bayonet ring is rotatably centred relatively to the straightening roller on a portion of the axial length of its outer periphery and is axially fixed while permitting a displacement corresponding to the change of length of the tie-rod, and which is constructed on the remaining portion of the axial length for receiving a withdrawal bayonet ring which is axially displaceable on the transfer shaft or stub and which in the locked position is displaceable together with the axially-fixed first bayonet ring and the straightening roller or the mounting sleeve onto the transfer shaft or stub to such extent that the straightening roller or the mounting sleeve together with the first bayonet ring is received by the transfer shaft or stub.

3. Apparatus according to claim 1, wherein a power-actuated pushing device is provided for each transfer shaft or stub, wherein each transfer shaft or stub comprises two axially-telescoped sleeves of which the outer sleeve is provided at one end with a head plate and the inner sleeve is provided at the opposite end with a bottom plate, wherein a power cylinder of the pushing device is disposed between the head plate and the bottom plate, and wherein the rotatable withdrawal bayonet ring is connected to the inner sleeve in the sense of a common axial movement.

4. Apparatus according to claim 3, wherein the withdrawal bayonet ring is rotatably, but axially-non-displaceably mounted on a support sleeve which is connected to the inner sleeve by means of peripherally-distributed inwardly-directed projections which penetrate through longitudinal grooves in the outer sleeve, wherein the support sleeve is guided on the remaining peripherally-distributed ledges of the outer sleeve, and wherein the longitudinal grooves are similar to the longitudinal grooves of the tensioning head of the extendable tie-rod.

5. Apparatus according to claim 4, wherein the outer sleeve of a transfer shaft or stub is rotatably mounted in the support device and the head plate of the outer sleeve supports an eccentrically-disposed centring pin which is axially-displaceable against the force of a spring and which when all longitudinal grooves assume a corresponding aligned position engages into a blind bore in the end face of the tensioning head of the extendable tie-rod.

\* \* \* \* \*